United States Patent

Dell et al.

[15] 3,691,359

[45] Sept. 12, 1972

[54] ASYNCHRONOUS BINARY MULTIPLIER EMPLOYING CARRY-SAVE ADDITION

[72] Inventors: Harold R. Dell, Palo Alto; Edwardo D. Lara, Cupertino, both of Calif.

[73] Assignee: Singer-General Precision, Inc., Binghamton, N.Y.

[22] Filed: July 28, 1970

[21] Appl. No.: 58,956

[52] U.S. Cl. ....................235/164

[51] Int. Cl. ....................G06f 7/54

[58] Field of Search ....................235/164

[56] References Cited

UNITED STATES PATENTS

| | | | |
|---|---|---|---|
| 3,069,085 | 12/1962 | Coopper et al. | 235/164 |
| 3,115,574 | 12/1963 | Paul et al. | 235/164 |
| 3,159,739 | 12/1964 | Deerfield | 235/164 |
| 3,192,366 | 6/1965 | Cochran et al. | 235/164 |
| 3,508,038 | 4/1970 | Goldschmidt et al. | 235/164 |

OTHER PUBLICATIONS

R. K. Richards, " Arithmetic Operations in Digital Computers" 1955, pp. 138- 140 and 160- 161.

Y. Chu " Digital Computer Design Fundamentals" 1962 pp. 447- 448.

C. S. Wallace, A Suggestion For a Fast Multiplier " IEEE Trans. on Electronic Computers" Feb. 1964 pp. 14- 17.

J. E. Partridge, Cascade Adder For Multiply Operations" IBM Tech. Disclosure Bulletin Vol. 13, No. 8, Jan. 1971 pp. 2406–2407

*Primary Examiner*—Malcolm A. Morrison
*Assistant Examiner*—David H. Malzahn
*Attorney*—Francis L. Masselle, William Grobman and Charles S. McGuire

[57] ABSTRACT

An arithmetic unit for accomplishing the multiplication of two binary numbers at high speeds is described herein. By utilizing a plurality of gates connected in successive stages, the combinations of individual digits of a multiplicand and a multiplier to produce the product thereof is accomplished. The gates of the successive stages are so connected as to shift the partial product produced at each stage by one digit to the right, the least significant digit of that stage being shifted out as a product digit. In the simplest case, there will be as many stages as there are multiplier digits. However, a modification of the basic system provides for the simultaneous combination of the multiplicand with a plurality of individual multiplier digits to reduce the number of stages required in the apparatus. Each stage produces carries which are added in by means of inter-spaced adders or half-adders at each stage. No timing signals are required since this apparatus operates as an asynchronous device. Therefore, each stage occupies only the time required to transfer the function through it, and the total multiplication process is speeded up thereby. The modification which permits simultaneous combination of a plurailty of multiplier digits with the multiplicand shortens the required multiplication time even further, and if special encoders are utilized, the total multiplication time can be even further reduced. Since no timing pulses are required, information flows through the multiplier as a ripple.

9 Claims, 5 Drawing Figures

INVENTOR.
HAROLD R. DELL
EDWARDO D. LARA
BY
William Grobman

| STEP | SHIFT CONTROL WORD | OPERATION | $b_3$ | $b_2$ | $b_1$ | $b_0$ | | | | |
|---|---|---|---|---|---|---|---|---|---|---|
| 1 | $SW_0 = 0$ | ACCUMULATED (STEP 0) | 0 | 0 | 0 | 0 | | | | |
| | | CARRY SUM (STEP 0) | 0 | 0 | 0 | 0 | | | | |
| | | ADD 0 | 0 | 0 | 0 | 0 | | | | |
| | | SUM (STEP 1) | 0 | 0 | 0 | 0 | | | | |
| | | CARRY (STEP 1) | 0 | 0 | 0 | 0 | | | | |
| | | SHIFT → | | | | | | | | |
| 2 | $SW_1 = 0$ | ACCUMULATED (STEP 1) | 0 | 0 | 0 | 0 | 0 | | | |
| | | CARRY SUM (STEP 1) | 0 | 0 | 0 | 0 | | | | |
| | | ADD 0 | 0 | 0 | 0 | 0 | | | | |
| | | SUM (STEP 2) | 0 | 0 | 0 | 0 | | | | |
| | | CARRY (STEP 2) | 0 | 0 | 0 | 0 | | | | |
| | | SHIFT → | | | | | | | | |
| 3 | $SW_2 = 1$ | ACCUMULATED (STEP 2) | 0 | 0 | 0 | 0 | 0 | 0 | | |
| | | CARRY SUM (STEP 2) | 0 | 0 | 0 | 0 | | | | |
| | | ADD icand | 1 | 1 | 1 | 1 | | | | |
| | | SUM (STEP 3) | 1 | 1 | 1 | 1 | | | | |
| | | CARRY (STEP 3) | 0 | 0 | 0 | 0 | | | | |
| | | SHIFT → | | | | | | | | |
| 4 | $SW_3 = 0$ | ACCUMULATED (STEP 3) | 0 | 1 | 1 | 1 | 1 | 0 | 0 | |
| | | CARRY SUM (STEP 3) | 0 | 0 | 0 | 0 | | | | |
| | | ADD 0 | 0 | 0 | 0 | 0 | | | | |
| | | SUM (STEP 4) | 0 | 1 | 1 | 1 | | | | |
| | | CARRY (STEP 4) | 0 | 0 | 0 | 0 | | | | |
| | | SHIFT → | | | | | | | | |
| 5 | FINAL SUM | ACCUMULATED (STEP 4) | 0 | 0 | 1 | 1 | 1 | 1 | 0 | 0 |
| | | CARRY SUM (STEP 4) | 0 | 0 | 0 | 0 | | | | |
| | | SHIFTED WORD | 0 | 0 | 1 | 1 | 1 | 1 | 0 | 0 |

FIG. 2

INVENTOR.
HAROLD R. DELL
EDWARDO D. LARA
BY William Grobman

INVENTOR

HAROLD R. DELL

EDWARDO D. LARA

BY William Grobman

ATTORNEY

| STEP | METHOD | OPERATION | icand | | | | | ier | | | | | |
|---|---|---|---|---|---|---|---|---|---|---|---|---|---|
| | | | | 1 | 1 | 0 | 1 | X | 1 | 0 | 1 | 1 | |
| 1 | $ier_1\ ier_0$ = 11 | ACCUMULATED (STEP 0) | 0 | 0 | 0 | 0 | 0 | | | | | | |
| | REQUIRES 3icand. ADD 4icand AND -icand. | CARRY SUM (STEP 0) | 0 | 0 | 0 | 0 | 0 | | | | | | |
| | ADD -icand THIS STEP AND CARRY TO | ADD -icand | 1 | 0 | 0 | 1 | 1 | | | | | | |
| | PRODUCE 4icand NEXT STEP. | SUM OF STEP 1 | 1 | 0 | 0 | 1 | 1 | | | | | | |
| | | CARRY FROM STEP 1 | 0 | 0 | 0 | 0 | 0 | | | | | | |
| 2 | $ier_3\ ier_2$ = 10 | SHIFT SUM (STEP 1) 2 SPACES | 1 | 1 | 1 | 0 | 0 | 1 | 1 | | | | |
| | REQUIRES 2icand PLUS icand. CARRIED | CARRY SUM (STEP 1) | | 0 | 0 | 0 | 0 | 0 | | | | | |
| | FROM STEP 1. ADD -icand THIS STEP AND | ADD -icand | 1 | 0 | 0 | 1 | 1 | | | | | | |
| | CARRY TO NEXT STEP TO PRODUCE 4icand. | SUM OF STEP 2 | 0 | 1 | 1 | 1 | 1 | 1 | 1 | | | | |
| | | CARRY OF STEP 2 | *(1) | 0 | 0 | 0 | 0 | | | | | | |
| 3 | ADD icand CARRIED FROM PREVIOUS STEP. | ACCUMULATED (STEP 2) SHIFTED | 1 | 1 | 0 | 1 | 1 | 1 | 1 | 1 | 1 | | |
| | | CARRY SUM (STEP 2) | | 0 | 0 | 0 | 0 | 0 | | | | | |
| | | ADD icand | | 1 | 1 | 0 | 1 | | | | | | |
| | | SUM OF STEP 3 | 1 | 0 | 1 | 1 | 0 | 1 | 1 | 1 | 1 | | |
| | | CARRY OF STEP 3 | 0 | 1 | 0 | 0 | 1 | | | | | | |
| 4 | ADD FINAL SUM | SUM, ACCUMULATED (STEP 3) | 1 | 1 | 1 | 0 | 1 | 1 | 0 | 1 | 1 | 1 | 1 |
| | | CARRY SUM (STEP 3) | 0 | 0 | 1 | 0 | 0 | 1 | 0 | 0 | 0 | 0 | 0 |
| | | PRODUCT | | | 0 | 1 | 0 | 0 | 0 | 1 | 1 | 1 | 1 |

*DELETE INITIAL 1 IN SAVED CARRY, SINCE THIS OCCURS ONLY BECAUSE OF COMPLEMENTED ADDITIONS.

FIG. 4

INVENTOR.
HAROLD R. DELL
EDWARDO D. LARA
BY William Grobman

INVENTOR
HAROLD R. DELL
EDWARDO D. LARA
BY William Grobman
ATTORNEY

ASYNCHRONOUS BINARY MULTIPLIER EMPLOYING CARRY-SAVE ADDITION

BACKGROUND OF THE INVENTION

When electronic computers were introduced to the world, they were hailed as a major step forward in the solution of many problems. Their great speeds of operation enable the solution of problems which were too complex to be solved by earlier methods or apparatus, or which were too long to offer a solution in a normal life time. Since the introduction of electronic computers, continual efforts have been made to reduce the solution times for problems even further.

Often, these efforts result in compromises because higher speeds can be achieved by utilizing more complex and expensive equipment. Thus, in order to devise general-purpose computers which do not occupy too much space and which remain relatively simple in organization, large computer systems will have but a single device to perform all of its arithmetic functions. In order for this to be feasible, a great deal of reiteration is required, and one classic system for multiplying two digits together was by the repeated addition of the multiplicand the number of times specified by the multiplier. By shifting the partial product the number of additions is reduced, but this type of multiplication still requires a great deal of time even though the amount of equipment is kept to a minimum. Another system which has been used for multiplying two digits together is a multiplication table constructed in the form of electronic components, relays or the like. The table generally comprises a plurality of matrices to which the multiplier is applied on one side and the multiplicand is applied on another. The partial product is indicated by the line or lines which are energized as a result of the two inputs. This type of multiplier is rapid, but it is extremely complex and requires a large amount of equipment. In such multiplication tables, a single matrix usually produces a partial product only of a single multiplier digit with a single multiplicand digit so that if the partial product of a single multiplier digit and the entire multiplicand is desired in a single operation, the amount of equipment must be enormously increased. If this amount of equipment is too great for the problem being considered, the multiplication process must occupy a larger amount of time.

In addition to the above-mentioned disadvantages of the prior art equipment and methods, the use of synchronous circuits has an added disadvantage. In order to ensure that each step of each operation proceeded in order, and to avoid conflicting operations in a large device, each step was initiated and controlled by a timing pulse, usually supplied from a central clock. This meant that no matter how fast any individual piece of equipment could operate, its successive stages of operation had to wait until the timing pulse arrived to initiate them. Even in the more complex systems, the use of timing pulses to control the individual operational steps added to the time required for a multi-step operation such as multiplication.

DESCRIPTION

Now, therefore, it is an object of this invention to provide a new and improved arithmetic apparatus which operates at high speeds.

It is another object of this invention to provide a new and improved multiplication device which operates at high speeds.

It is a further object of this invention to provide a new and improved high-speed apparatus for producing the product of two digital quantities.

It is still another object of this invention to provide apparatus for accomplishing the multiplication of two digital quantities without the use of timing devices.

Other objects and advantages of this invention will become apparent as the following description proceeds, which description should be considered together with the accompanying drawings in which:

FIG. 2 is a chart setting forth the individual steps performed by the apparatus of this invention in shifting a number by a prescribed amount;

FIG. 4 is a chart setting forth the several steps in a multiplication operation according to this invention in which multiplication is accomplished in a reduced number of steps.

Figure 1:
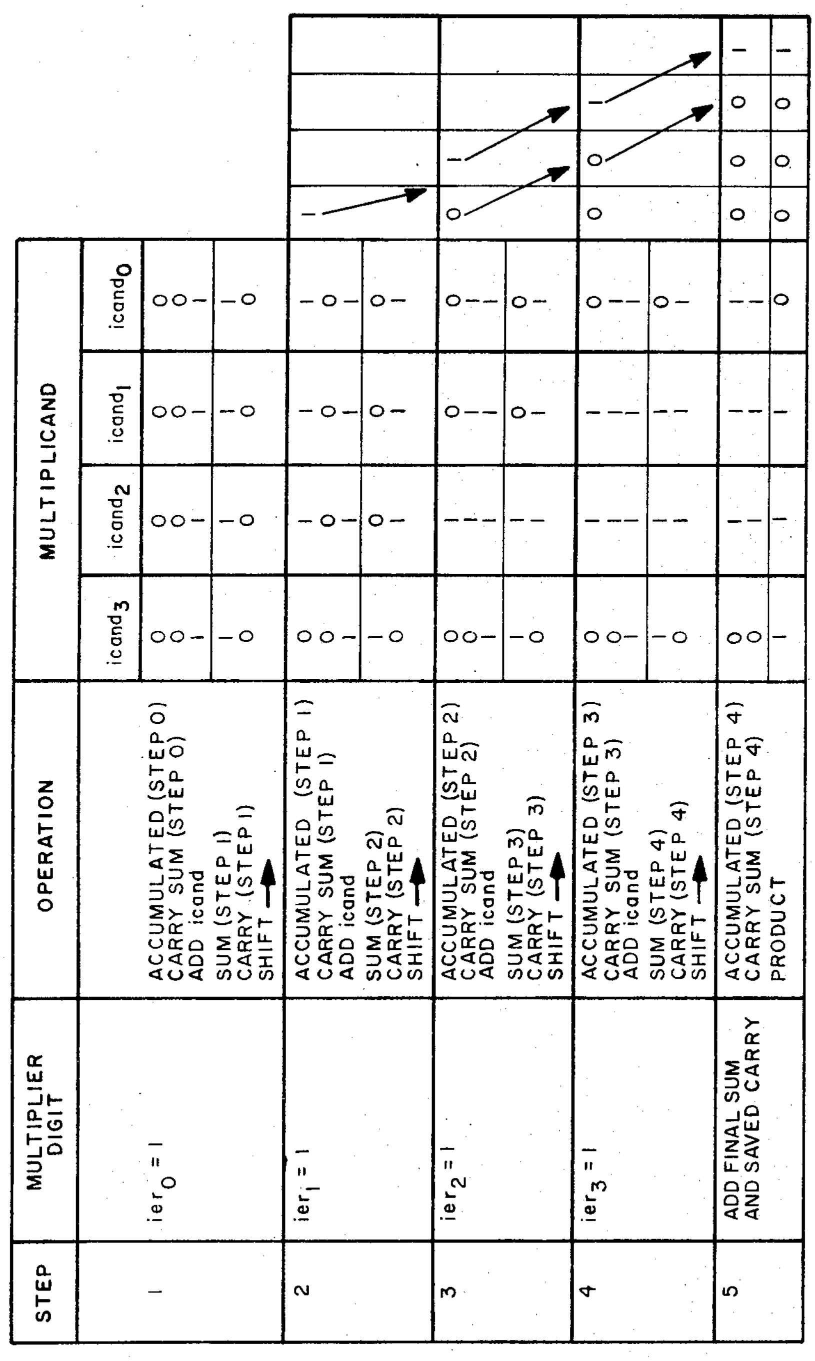
FIG. 1 is a chart setting forth the steps performed by the apparatus of this invention in multiplying two numbers.

The method and apparatus of this invention are primarily to increase the speed of computation. To illustrate the operational method used by the apparatus disclosed herein, the chart of FIG. 1 is provided. Basically, in order to provide maximum computation speed with a minimum of complex equipment, it is contemplated that the entire multiplicand will be processed by an individual digit of the multiplier at each step in the simplest method, and that the entire multiplicand will be processed by more than one multiplier digit in each step in the later embodiments discussed. In binary notation, of course, each digit can have either a 0 condition or a 1 condition. If a multiplier digit is 0, then the multiplicand is not added to the partial product in that particular digit position. If, on the other hand, the multiplier digit in any particular digit position is a 1, then the multiplicand is inserted at that particular step. With this simplified explanation, the method disclosed in FIG. 1 can be better appreciated.

The table of FIG. 1 shows five separate steps which are numbered 1 through 5 in the left-hand column. Each operational step comprises the following parts: (a) The accumulation of values from a prior step; (b) The application of the carry sum from the prior step; (c) Insertion of the multiplicand in that step; (d) The summation of the above values; and (e) The presentation of any carry produced at that step. For the example presented by FIG. 1, it is assumed that the multiplier and the multiplicand are both four digit numbers and are both the same quantity; namely, 1111. Referring now to FIG. 1 and to step 1 of the figure, the first multiplier digit considered is 1. This is the least significant digit and can be represented by $X^0$. Since this is the first step, the accumulated amount from a prior step is, naturally, 0, and the carry sum from the prior step is also 0. The multiplicand, 1111, is added to the accumulated sum and to the carry sum to produce the sum of step 1 which is 1111. This addition produced no carries, so the carry for the next stage is 0000. This completes step 1 of the operation. Step 2 follows the same format as step 1 with the added feature which takes place between step 1 and step 2 of shifting the sum produced in step 1 a place to the right. This is equivalent to dividing by two. Therefore, the amount to be added in step 2 is 0111 with a fourth 1 shifted a place to the right and accumulated in the final product as it is. There was no carry added in step 2. Since the second multiplier digit, that which is represented by $X^1$, is 1, the multiplicand is added to the shifted accumulated sum and the carry. The sum in step 2 is 1000 and a carry is produced in step 2 which is 0111. The operation of step 3 is similar to that of step 2. That is, the sum of step 2 is shifted one place to the right and appears in step 3 as 0100 with a 0 shifted out to the right. The 1 which was shifted out in step 2 is also shifted a place to the right so that those digits shifted out of the multiplication process are now 0 and 1. The carry from step 2 is 0111 and this is added to the shifted accumulated total and, since the third multiplier digit is 1, to the multiplicand which is 1111. The sum in step 3 is 1100 and the carry which is generated is 0111. Step 4 is the same as steps 2 and 3. Step 5 accumulates the final carry and the shifted sum from step 4 to produce the final product. It must be remembered that in each operation the carry produced by the addition of the digits in a single digit position is accumulated separately and is then added in the next subsequent step in the operation to save time. The final product comprises the final sum or partial product produced in step 5 and the digits which were shifted out of the operation to the right in each step of the operation. In addition, FIG. 1 illustrates that the number of digit positions taking part in any addition is always the same even though the final product contains as many digit positions as there are in the sum of both the multiplier and the multiplicand. Using the example of FIG. 1, only four operational orders are required in each stage. Thus, even though the entire multiplicand is utilized in each step of the operation, the amount of equipment required is kept to a minimum.

Figure 3:
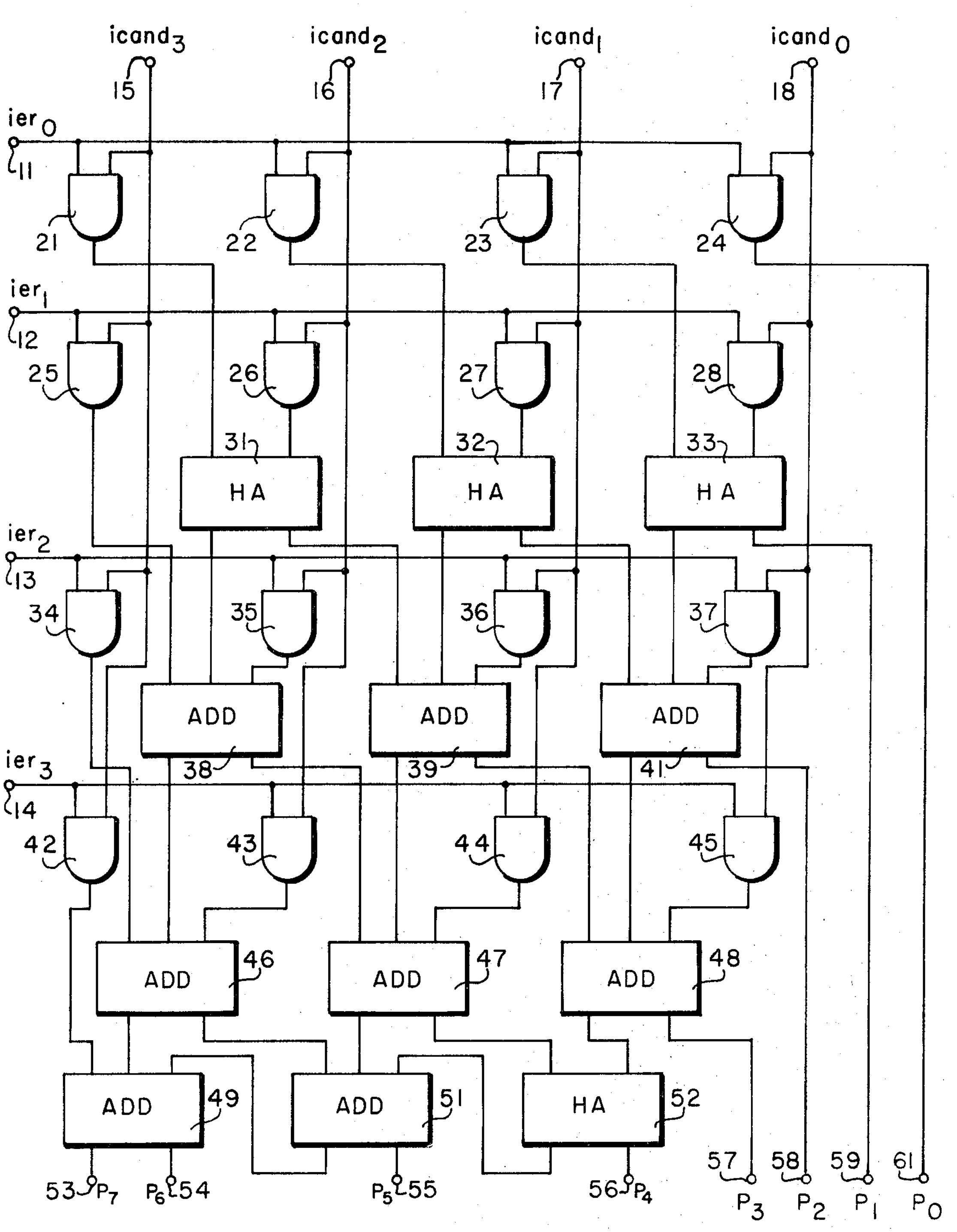
FIG. 3 is a functional block diagram of a multiplier according to this invention.

The apparatus for accomplishing the operation shown in FIG. 1 is shown in schematic form in FIG. 3. The apparatus comprises a matrix in which each row of gates performs the first part of an operational step as shown in the table of FIG. 1. The matrix comprises four separate rows of gates, the first row including gates 21, 22, 23, and 24; the second row including gates 25, 26, 27, and 28; the third row comprising gates 34, 35, 36, and 37; and the fourth row comprising gates 42, 43, 44, and 45. Each gate 21–28, 34–37 and 42–45 has two inputs, one input being a multiplier digit and the other input being a multiplicand digit. The gates in the first row of gates 21–24 are all connected to the multiplier digit input having least significance; the gates of the second row of gates 25–28 are all connected to the second multiplier digit input $ier_1$; the gates of the third row of gates 34–37 are all connected to the third multiplier digit input $ier_2$; and the gates of the fourth row of gates are all connected to the fourth multiplier digit input $ier_3$. The apparatus shown in FIG. 3 is exemplary of the apparatus used in the invention and is arranged to perform the operation shown in tabular form in FIG. 1. Since, in FIG. 1, the multiplications are performed by a 4-digit multiplier and a 4-digit multiplicand, only sufficient apparatus is shown in FIG. 3 to handle numbers of that size. Similar to the manner in which the rows of gates are connected, the gates are also arranged in columns of four each with each gate in the first column of gates from the left, comprising gates 21, 25, 34, and 42, being connected to the multiplicand digit having the most significance. In a similar manner a second column is formed of gates 22, 26, 35, and 43 which are all connected to $icand_2$; a third column comprising gates 23, 27, 36, and 44 which are all connected to $icand_1$; and the last column of gates 24, 28, 37, and 45 which are all connected to the least significant multiplicand digit $icand_0$. Thus, each gate has a multiplier input and a multiplicand input, and the output of that gate represents the single combination of a particular multiplicand digit equal to 1 and a particular multiplier digit equal to 1. With any combination which includes 0's, the output of the gate will not be energized. In addition to the gates which perform the first part of any operation step shown in the table of FIG. 1, adders are included to add together the partial product of a previous step with the digits which are introduced by any particular row of gates. Since the only operation in the first step is the insertion of the multiplicand, there are no adders used in the first row in FIG. 3. Further, since no addition takes place in the first step, no carries are produced, so the first row of adders need not be full adders but can be half-adders. The difference between a full adder and a half-adder, of course, being one input since a full adder adds not only the two quantities applied to it but also a carry. Half-adders 31, 32, and 33 provide the first row of adders in the system. Each of the half-adders 31–33 has two inputs and two outputs. One input to each half-adder will come from a gate in the first row of gates, and the other input to each half-adder is applied from the second row of gates. To perform the equivalent of a shifting of the quantity from the previous step, a half-adder will have an input from a gate of row one and an input from a gate of row two which is the next lower digit position. The two outputs of the half-adder comprise the sum and the carry, with the carry being represented by the left output and the sum by the right output. The third operational row of the apparatus of FIG. 3 includes the gates 34–37 and three full adders 38, 39, and 41. Each full adder includes three inputs and two outputs. Two of the inputs to each of the adders 38–41 are applied in the same manner in which the inputs to each of the half-adders 31–33 are applied. Thus, an input to each adder will come from the previous step and represent a digit of the partial product of that step and another input will come from a gate in the next lower digit position of the same row that the adder is in. The third input to each adder is a carry digit from the previous step. Their three inputs are added together in each adder to produce two outputs, a sum output which is the right-hand output and a carry output which is the left-hand output of the adder. The adders 46, 47, and 48 are part of the fourth operational row of FIG. 3 and are connected in the same manner as are the adders 38–41 of the third operational row. The fifth step in the multiplication operation as shown on the table of FIG. 1 is performed by two adders 49 and 51 and a half-adder 52. Since the fifth step comprises adding together the sums and the carries from the previous step, this is accomplished by these three elements. The product output of the system shown in FIG. 3 appears at terminals 53, 54, 55, 56, 57, 58, 59, and 61. These are further identified as product digits, $P_7$–$P_0$.

The system of FIG. 3 operates in the manner described in connection with the table in FIG. 1. The individual gates 21–28, 34–37, and 42–45 produce outputs when the two digits supplied to the inputs are both 1's. Should the multiplier digit be 0, then none of the multiplicand digits are inserted at that step. Should the multiplier digit be 1, then the multiplicand is applied at that step. This insertion of the individual digits of the multiplicand at one step or another is controlled by the individual gates, each row of gates representing the insertion of the multiplicand digits at that particular stage. To perform the multiplication as illustrated in the table of FIG. 1, the multiplicand is or is not inserted at the separate steps in accordance with the multiplier digit, and the multiplicand so inserted is added in that same step to the partial product which resulted from the previous step. To reduce the time for each step, the addition of any carries which are produced takes place at a later time. In this manner all of the carries from one step form a word which can be added in the next following step. When the individual digits of the multiplier are applied to the input terminals 11, 12, 13, and 14 and the individual digits of the multiplicand are applied to the input terminals 15, 16, 17, and 18, the apparatus of FIG. 3 is energized and operated to produce a product. The least significant multiplier digit $ier_0$, in this case 1, enables the gates 21–24 to permit the individual multiplicand digits to pass therethrough. Since the multiplicand for this example is 1111, the outputs of all of the gates 21–24 are energized. As indicated in the discussion of FIG. 1, the output of the gate 24 becomes the least significant digit of the product and is applied to output terminal 61 as $P_0$. The outputs of the other gates 21–23 are individually applied as inputs to the half-adders 31–33. The gate 21 is in the $icand_3$ column but its output is applied to the half-adder 31 which is in the $icand_2$ column. This effectively produces a shift one place to the right in the output of each step when applied as an input to the next step. The outputs of the gates 22 and 23 are similarly applied to the inputs to half-adders 32 and 33. At the same time, the $ier_1$ digit, which is applied to the input terminal 12, determines the passage of the multiplicand through the gates 25–28. The outputs of gates 26–28 are applied as the second inputs to the half-adders 31–33. At the same time these half-adders 31–33 generate the sums of the inputs applied to them and energize their carry and sum output lines. The output of the gate 25 is applied to the next step. Similar to the insertion of the multiplicand in steps 1 and 2, the multiplier digit $ier_2$, applied to input terminal 13, determines the insertion of the multiplicand in the third step of the operation by the opening of gates 34–37. This step includes the full adders 38–41, and the output of gate 25 of step 2 is applied as one input to an adder 38 while the carry output from the half-adder 31 is a second input, and the output of gate 35 is a third input to the adder. In a similar manner the full adders 39 and 41 include as inputs a digit of the sum from the previous step, a digit of the carry from the previous step, and a digit from the multiplicand as inserted in this step. The outputs from the full adders 38, 39, and 41 are applied in a like manner to the components of the fourth step, adders 46, 47, and 48. Since, in the operation of the system of FIG. 3, the partial product produced at each step is shifted one place to the right in transfer to the next following step, a digit of that partial product is removed from further operation. In this manner each step provides a digit of the final product. The rest of the digits of the final product are provided by the outputs of the two adders 49 and 51 and the half-adder 52. This last step which utilizes the adders 49 and 51 and the half-adder 52 is the final summation of the partial product from the fourth step and of the carries produced therein. So, the sum output of the adder 48 in the fourth step of the apparatus produces the product digit $P_3$, and the carry output from the adder 48 is applied to the half-adder 52 where it is added to the sum output from the adder 47. The sum output of the half-adder 52 is the product digit $P_4$, and its carry output is applied as one input to the adder 51, the next higher order, where it is added to the carry output of the adder 47 and the sum output of the adder 46. The sum output of the adder 51 is the product digit $P_5$, and its carry is applied to the adder 49, whose sum output is the product digit $P_6$, and whose carry output is the product digit $P_7$.

Since the apparatus of FIG. 3 does not utilize clocking pulses, the information is available at each step as soon as the equipment in the previous step has stabilized at its value. In this manner, the information flows through the entire multiplication system at a rate which is limited only by the transfer time of the individual components. Of course, the input information applied to the multiplicand terminals 15–18 and to the multiplier terminals 11–14 must exist for at least as long as the time required for the information to completely flow through the entire system of FIG. 3. Information in the form of short pulses may be temporarily stored in a register to ensure that the potentials exist long enough for the entire multiplication to take place.

The apparatus of FIG. 3 incorporates some basic requirements. The insertion of the multiplicand at any step is determined by the existence of 1 in the multiplier at the corresponding digit position. This is accomplished by a single gate for each digit in the multiplicand. In a step where a previous partial product was formed, the digits of the previous partial product are individually added to the digits of the next lower digit position of the multiplicand. In this manner, at each step of the operation the partial product is shifted a step to the right. Where only an insertion of a multiplicand is required in a step, that step comprises only gates. Where a step incorporates the addition of a partial product and a multiplicand, only half-adders are required. Where a step requires the addition of a partial product, the multiplicand, and carries produced in an earlier step, then full adders are required. At each step the least significant digit resulting from that step forms a digit of the product, with the least significant digit of the first step forming the least significant digit of the product. Thus, utilizing the principles set forth above and the apparatus shown in FIG. 3 and the method shown in FIG. 1, it is possible to construct a multiplier for multiplying together a pair of numbers having as many digits as desired.

The apparatus of FIG. 3 can also be used to shift a digital word a prescribed number of spaces to the right. The method used is shown in the table of FIG. 2. The word to be shifted is applied to the multiplicand input terminals 15–18 (of FIG. 3), and another word, arbitrarily constructed to control the number of shifts required, is applied to the multiplier input terminals 11–14. The word applied to the multiplier terminals 11–14 is comprised of 0's, except for 1 in that digit position which is the prescribed number of shifts from the most significant digit. Assume for this discussion, as shown in FIG. 2, that the number to be shifted comprises all 1's (1111). Also assume that this word is to be shifted two spaces to the right. Then, as shown in FIG. 2, the word applied to the multiplier terminals 11–14 is 0010. As shown in FIG. 2, since the first (least significant) multiplier digit applied to terminal 11 is 0, the number to be shifted is not introduced in the first step, and, since there is no partial product from an earlier step, the sum and the carries from step 1 comprises 0000. In step 2, the multiplier digit, the digit applied to the terminal 12, is again 0, and the word to be shifted is not introduced in the second step, either. Thus, all of the numbers to be added together in step 2 are 0's and produces a sum output which comprises 0000 and a carry word 0000. However, the third digit applied to the input terminal 13 is 1 and, as explained above in connection with FIG. 3, this causes the introduction of the word to be shifted in step 3 by means of gates 34–37. This is shown in step 3 in FIG. 2. Since all of the previous quantities to be added to the number to be shifted are 0's, the sum output from step 3 is 1111, the number to be shifted. The carry from step 3 is 0000. In step 4, the digit applied to the terminal 14 is another 0, which prevents the introduction of the number to be shifted in this step also. However, since the sum output of step 3 was 1111, this is applied to step 4 shifted one space to the right so that the output from the gates 34–37 are applied as inputs to the adders 38, 39, 41, and 46. In step 4, as in the earlier steps, the shifted sum from step 3 is added to the number introduced in step 4 producing a sum and carries. Since only 0's are added to the shifted sum from step 3, the sum output from step 4 comprises 0111 and 1 is shifted out as the output of adder 41 to form the product digit $P_2$. Thus, the word to be shifted has now been shifted a space to the right. The output from step 4 is again shifted a step to the right when applied to step 5 which is the final summation step. Since the carries in this operation are also 0' s, the final summation is really the shifted total handed down from step 3 through step 4. So the second shift takes place when the quantity is transferred from step 4 to step 5 producing a number 0011 with the two least significant 1's shifted out to the right, forming the product digits $P_3$ and $P_2$. In this manner, the number to be shifted is shifted the prescribed number of spaces by a word which has only 0's, except for a single 1 in that position which is the number of shifts in from the most significant digit.

The apparatus of FIG. 3 performs multiplication by multiplying the multiplicand by a single digit of the multiplier at each step. In a device of that type where the binary numbers comprise $n$ digits, the number of gates which would be required is $n^2$. In addition, such a system would require $n$ half-adders and a number of full adders which is also related to $n$. The apparatus of the type shown in FIG. 3 performs those operations in n steps, and the time required to produce the product in such a device is one gate time plus $n-1$ adder times plus $n$ carry times. By reducing the number of steps in the operation it may be possible to reduce the amount of time required to produce a product. One method for accomplishing this is to multiply the multiplicand by two digits of the multiplier at each step. Such a method is shown on the chart of FIG. 4 where the multiplicand (icand) is represented by a first 4-digit word (1101) and the multiplier (ier) is represted by a second 4-digit word (1011). Although the chart of FIG. 4 shows four steps, the multiplication is actually performed in two steps, and the last two steps merely shift and add the carries. In the first step the two least significant digits of the multiplier ($ier_0$ and $ier_1$) are used. These two digits are 11 and they represent the amount 3 which means that to accomplish the multiplication, three times the multiplicand (3icand) must be added in. To obtain three times the multiplicand, this method adds in 4icand and subtracts 1icand. Adding 4icand is readily accomplished by generating a carry, which, since the carry is added to the third multiplier digit, is the same as 4icand. In the table of FIG. 4 under the column labeled operation it is shown that the accumulated amount of step 0 is 0. The carry sum from step 0 is also 0. Adding in −icand is the same as adding in the 2's complement of the multiplicand and this is accomplished by inverting the digits and adding 1. Thus, the quantity 10011 is inserted. The sum of all of the values of step 1 is 10011, and the carry to be added at this point is 0000. In step 2 the multiplier digits $ier_3$ and $ier_2$ are 10 which require 2icand. However, a carry, representing icand in step 2, was produced in step 1 which carry, when added to 2icand, produces 3icand. Thus, the procedure in step 2 is the same as that in step 1. The accumulated sum in step 1, shifted two spaces to the right, is 11100, and the two least significant bits (11) are shifted out to become the least significant bit of the product. A 1 in the most significant position of that word indicates that the word is negative and the two empty spaces produced on the left by the right shift are filled with 1's. The carry sum of step 1 is again 0000. As above, −icand (10011) is added, and the sum of step 2 is 01111. The addition or the summing of step 2 produced a carry of step 2 which was produced only because of a negative overflow from the addition itself. This is identified by the * and is to be ignored since it does not denote a carry for multiplication purposes. In step 3, the multiplication carry produced in step 2 is inserted. This was the amount which, when carried to step 3 and shifted two spaces to the left, produces the equivalent of 4icand in step 2. Therefore, the sum which is accumulated in step 2 is shifted two spaces to the right and produces 11011, has two bits (11) shifted out to form the next two most significant bits of the product. At this point, the partial product is 1111. No carry is produced by the summing of step 2. The carry, which is the equivalent of 4icand in step 2, is now inserted, and the sum is produced. The sum is 10110, and the sum carry of step 3 is 01001. In step 4 the accumulated sum of step 3, shifted 2 spaces to the right, and the sum carry produced in step 3, also shifted to the right, are added. The final summation takes place to produce the product which comprises the eight least significant bits and is 10001111. Summarizing the method of FIG. 4, it can be said that the multiplier is considered two bits at a time and each pair of bits is examined so that the number of times the multiplicand is to be added in can be determined. Considering the multiplier two-bits-at-a-time, there are four possible combinations which may exist. These four combinations are 00, 01, 10, and 11, and it is apparent that three different values of the multiplicand are required. These are the the multiplicand itself, two times the multiplicand, and three times the multiplicand. The multiplicand is available, and two times the multiplicand readily can be acquired by shifting the multiplicand itself one bit to the left. However, obtaining three times the multiplicand is a different story. One way in which this can be accomplished is by adding together the multiplicand itself and two times the multiplicand. This method requires adders in the hardware to obtain three times the multiplicand as a source word. The manner of obtaining 3icand chosen for the method of FIG. 4 is adding the complement of the multiplicand in one step and then adding the multiplicand in the next higher step. Since the sum to which the multiplicand is added at the next higher step is shifted two places to the right, this is equivalent to shifting the multiplicand two places to the left, and that is the same as 4icand. In order to accomplish the method of FIG. 4, three quantities must be available at each step. These quantities are: icand, 2icand, and −icand.

Figure 5:
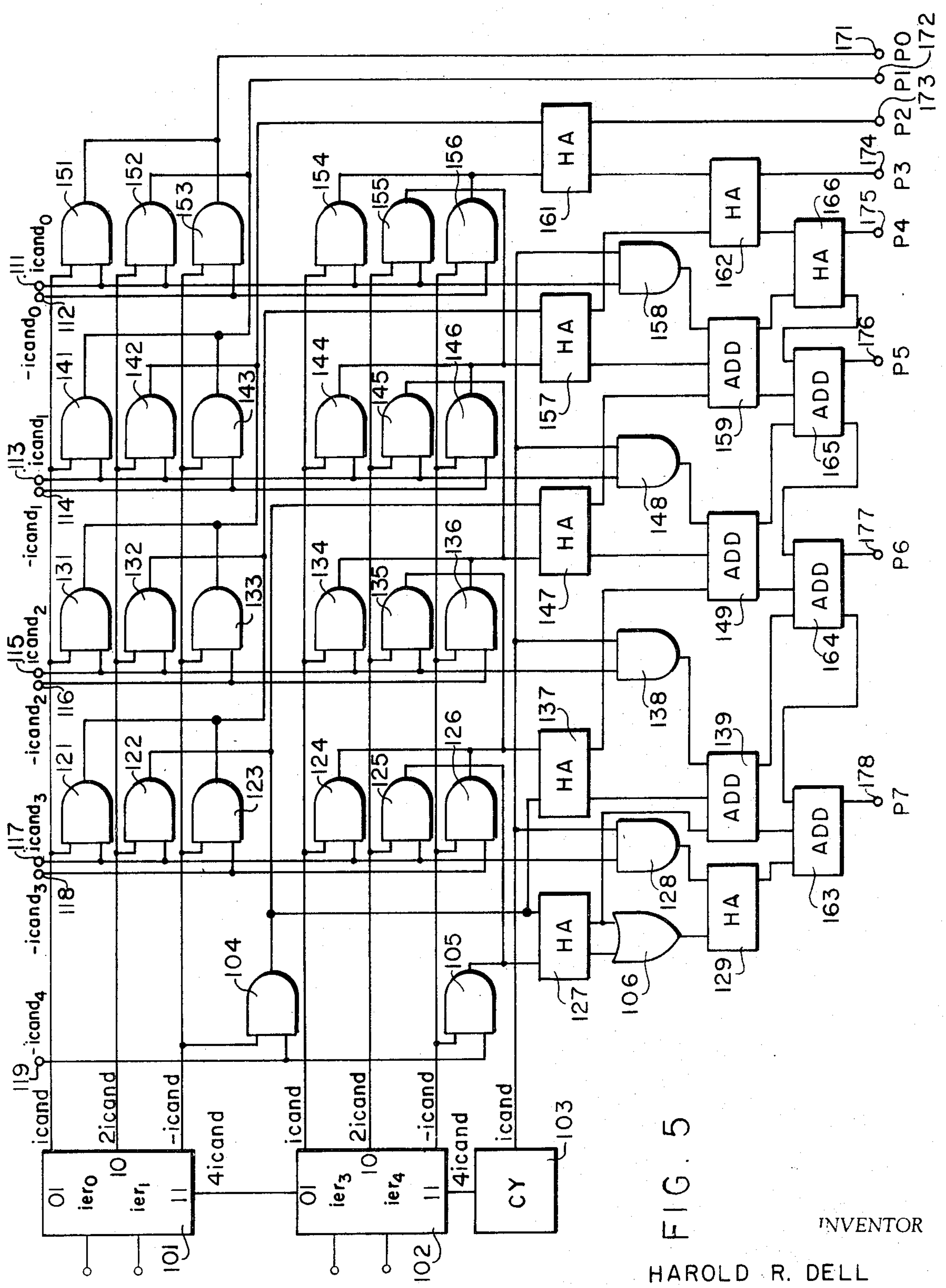
FIG. 5 is a functional block diagram of another embodiment of the apparatus of this invention.

Apparatus for accomplishing the method of FIG. 4 is shown in FIG. 5 which has decoders 101 and 102 for decoding the value represented by pairs of multiplier digits. Decoder 101 has the two least significant multiplier digits, $ier_1$ and $ier_0$, applied to it and produces a signal on any of three output lines at any time. The three output lines represent the switching of icand, 2icand, or −icand. To accomplish the switching, the system of FIG. 5 is provided with a first matrix of gates having three rows and four columns. The three rows represent the three switching conditions, and the four columns represent the four multiplicand digits used in this example. Of course, it must be understood that the system shown in FIG. 5 is exemplary only, and that multiplier and multiplicand words having any suitable numbers of digits can be used with this type of apparatus. The gates in each row of gates are identified by reference characters in which the last digits are the same. For example, the gates of the first row are gates 121, 131, 141, and 151; the gates of the second row are identified as 122, 132, 142, and 152; and the gates of the third row are identified as 123, 133, 143, and 153. Similarly, the gates of each column are identified by reference characters in which the second digits are the same. Thus, starting with the left most column, the gates are 121, 122, and 123; the next column to the right contains gates 131, 132, and 133; the next column to the right comprises gates 141, 142, and 143; and the right column includes gates 151, 152, and 153. Each of these gates has two inputs, one of which is connected to an appropriate multiplicand input terminal 111, 112, 113, 114, 115, 116, 117, 118, and 119; and the other of which is connected to the appropriate output line from the decoder 101. Each of the gates of the first row of gates 121, 131, 141, and 151 has one input connected to that output from the decoder 101 which represents icand; each of the gates in the second row of gates, 122, 132, 142, and 152, has one input connected to that output from the decoder 101 which represents 2icand; and each of the gates of the third row of gates, 123, 133, 143, and 153, has one input connected to that output of the decoder 101 which represents −icand. The gates 151 and 152 of the right column of gates have their other inputs connected to the input terminal 111 which has applied to it the least significant digit ($icand_0$) of the multiplicand, and the gate 153 has its other input connected to the input terminal 112 which has the complement of $icand_0$ applied thereto. In a similar manner, the other input to the gates 141 and 142 of the next column of gates are connected to the input terminal 113 which has the digit $icand_1$ applied thereto; the gate 143 has the complement of the $icand_1$ applied to its other input through terminal 114; gates 131 and 132 have their other inputs connected to terminal 115 to receive $icand_2$, and gate 133 has its other input connected to the terminal 116 from which it receives $-icand_2$; and the gates 121 and 122 have their other inputs connected to the terminal 117 which has the $icand_3$ digit applied thereto while the gate 123 has its other input connected to terminal 118 which applies the $-icand_3$ thereto. An additional gate 104 has one input connected to a terminal 119 from which it receives $-icand_4$, and its other terminal connected to the −icand output of the decoder 101 to supply the overflow digit of the complement.

A second matrix of gates also comprises three rows and four columns with the reference characters following the same logical designations mentioned above. The top row of gates comprises gates 124, 134, 144, and 154; the second row includes gates 125, 135, 145, and 155; and the third row comprises gates 126, 136, 146, and 156. The right column includes gates 154, 155, and 156; the next column to the left includes gates 144, 145, and 146; the next column comprises gates 134, 135, and 136; and the left column comprises gates 124, 125, and 126. Each gate of the three rows of gates has one input connected to the icand output of the decoder 102, the 2icand output of the decoder 102, or the −icand output of decoder 102 similarly to the gates of the matrix described above. Also, the gates in each of the columns have the other outputs connected to either the $icand_0$ or $-icand_0$, $icand_1$ or $-icand_1$, $icand_2$ or $-icand_2$, and $icand_3$ or $-icand_3$. Another gate 105 has one input connected to the terminal 119 to receive $-icand_4$ and its other input connected to the −icand output from the decoder 102. There is a carry connection from the decoder 101 to the decoder 102 so that the effect of a carry (4icand) from 101 to 102 can be taken into consideration when the digits are decoded in 102. A device 103 receives a carry (4icand) from the decoder 102 to generate an output.

A first row of half-adders comprising half-adders 127, 137, 147, 157, and 161 receives inputs from the gates described above. Half-adder 127 has two inputs, one of which is connected to the outputs from gates 105 and 125, and the other of which is connected to the outputs of gates 104 and 122, which two outputs are also applied as one input to each of half-adders 137 and 147. The other input to half-adder 137 is connected to the outputs of gates 124, 126, and 135. The other input to half-adder 147 is connected to the outputs of gates 134, 136, and 145. One input to half-adder 157 is connected to the output from gates 144, 146, and 155, and the other input to the half-adder 157 is connected to the outputs of gates 121, 123, and 132. One input to half-adder 161 is connected to the outputs of gates 154 and 156, and the other input to the half-adder 161 is connected to the output of gates 131, 133, and 142. The outputs of gates 151 and 153 are connected to terminal 171 and the output from gate 152 is connected to terminal 172 and represent the two least significant digits of the product.

Each half-adder has a sum output and a carry output, and for this description the sum output is to the right and the carry output is to the left. This standard is followed with all of the adders and half-adders in FIG. 5. The sum output from the half-adder 161 is connected to an output terminal 173 which is the third digit of the product. The carry output from the half-adder 161 is applied to one input of a half-adder 162, whose other input is the sum output from the half-adder 157. The carry output from the half-adder 157 is applied as one input to an adder 159. Half-adder 147 has its sum output applied as another input to the adder 159 and its carry applied as one input to an adder 149. Half-adder 137 has its sum output applied as a second input to the adder 149 and its carry output applied to one input of an adder 139. The half-adder 127 has its sum output applied as a second input to the adder 139 and both its sum and carry outputs applied as inputs to an OR gate 106. The output of the OR gate 106 is applied as one input to a half-adder 129 which has its other input connected to the output of a gate 128 which has one input connected to the terminal 118 from which it receives $icand_3$, and its other input connected to the output of a carry switching device 103. The input to device 103 is a carry from the decoder 102. The third input to the adder 139 is from the output of a gate 138 which has one input connected to input terminal 115 to receive $icand_2$, and its other input connected to the output from device 103. The third input to the adder 149 comes from the output of a gate 148 which has one of its two inputs connected to the input terminal 113 from which it receives $icand_1$, and its other input connected to the output of the device 103. The third input to the adder 159 is the output from a gate 158 which has two inputs, one of which is connected to input terminal 111 to which is applied $icand_0$, and the other of which is connected to the output of the device 103. The sum output of the half-adder 162 is applied to an output terminal 174 as the fourth product digit, and the carry output from the half-adder 162 is applied as one input to a half-adder 166. The other input to the half-adder 166 is the sum output of the adder 159, whose carry output is applied as one input to an adder 165. Another input to the adder 165 is the sum output of the adder 149, whose carry output is applied as one input to an adder 164. The sum output from the adder 139 is applied as another input to the adder 164, and the carry output of the adder 139 is applied as one input to an adder 163. A second input to the adder 163 is the sum output of the half-adder 129 whose carry output is not used. The sum outputs of the adders 163, 164, and 165 and the half-adder 166 are the four most significant digits of the product which are applied to output terminals 178, 177, 176, and 175, and the carry outputs of these adders are applied to the next higher digit position adder as an input, with the carry output from the half-adder 166 applied to the adder 165, the carry output from the adder 165 applied to the input of the adder 164, and the carry output of the adder 164 applied as an input to the adder 163.

In operation, the multiplicand digits are applied individually to the input terminals 111, 113, 115, and 117 and the complement of the icand digits are simultaneously applied to the input terminals 112, 114, 116, 118, and 119, with the lowest numbered terminal representing the least significant digit. The multiplier digits are applied in pairs to the decoders 101 and 102 with digits $ier_1$ and $ier_0$ applied to decoder 101 and digits $ier_3$ and $ier_2$ applied to the decoder 102. Thus, the decoders 101 and 102 analyze the pair of multiplier digits which are applied to them and energize the appropriate output line in accordance with the amount represented by the pair of digits. When the two digits in a pair are 01, then the top line of decoder 101 or 102 is energized; when the two digits are 10, then the center line of the two decoders is energized; and when the pair of digits is 11 then both the bottom line and the carry line of the decoder are energized. This is in accordance with the operation or method described in connection with FIG. 4. As indicated above, when a carry is generated by the decoders 101 or 102, it is the same as passing on the multiplicand shifted twice to the left (4icand). Assume that the digits $ier_1$ and $ier_0$ in decoder 101 are 01, then the top line of the decoder 101 is energized. This applies a signal to one input of all of the gates 121, 131, 141, and 151 of the top row of gates, and those gates in the top row which have a 1 applied to their other input are opened to apply a signal to the next stage. Assume, for this discussion, that the multiplicand is 0001. Then the terminal 111 is the only one which has a 1 applied to it, and gate 151 is the only gate to pass on a signal. The output of the gate 151 is applied to the output terminal 171 as the least significant digit of the product. Should the two multiplier digits ($ier_1$ and $ier_0$) applied to the decoder 101 be 10, then the center output line from the decoder 101 is energized and a signal is applied to one input to each of the second row of gates 122, 132, 142, and 152. Again, only one gate is opened to pass a single 1 and that is the gate 152. Energization of a line represents a 1. The output of the gate 152 is applied to the output terminal 172 and forms the next to the least significant digit of the product. From this it can be seen that the effect of utilizing the second row of gates rather than the first row of gates is the same as using 2icand rather than icand itself. Should the contents of the decoder 101 be 11, then the bottom line from the decoder 101 is energized and the third row of gates 123, 133, 143, and 153 have their inputs energized. However, the gates in the third row of gates do not have their second inputs connected to the icand terminals, but, instead, have their inputs connected to the complement of the icand terminals. Since the icand is 0001, the inverse plus 1 is 11111. In this case, all of the gates 123, 133, 143, and 153 have 1s applied to both of their inputs. In addition, the gate 104 has both inputs energized. As expected, the outputs of the gates in the third row, and the outputs of the gates in the first row are connected together, so that the output of the gates of the third row is the complement of icand, not of 2icand. In addition, a carry is generated by the decoder 101 whenever it contains 11, and that carry is applied to the decoder 102 which adds 1 to its contents. The operation of the decoder 102 and the second matrix of gates is the same as that described in detail above for the decoder 101 and the first matrix of gates. Therefore, no detailed description of the second matrix and the decoder 102 will be given.

So far, the description of the operation of the apparatus of FIG. 5 has dealt only with the switching necessary to select which of three quantities would be used in any case. The actual summation of the various signals takes place in the adders and half-adders to which the gate outputs are applied. Consider first the situation described above where the multiplicand is 0001, $ier_0$ is 1 and $ier_1$ is 1. The bottom line of the decoder 101 is energized, and a carry is generated to be applied to the decoder 102. Assume, also, that $ier_2$ is 0 and $ier_3$ is 1. In the first matrix, gates 123, 133, 143, and 153 have one of their inputs energized from the decoder 101. The other inputs to each of these gates comes from the terminals 112, 114, 116, 118, and 119 which carry the complement of the icand. Since the icand is 0001, the complement is 1111, and all of the gates 104, 123, 133, 143, and 153 are opened to pass a signal. The output from gate 143 is applied to output terminal 172 to form the next to the least significant digit of the product, and the output from gate 153 is applied to terminal 171 as the least significant product digit. The output from the gate 133 is applied to one of the inputs to the half-adder 161, and the output from the gate 123 is applied to one of the inputs of the half-adder 157. The gate 104 is used only when the complement of the icand is utilized, and its output is applied simultaneously to one input to the half-adder 147 and also to one input of the half-adders 127 and 137. Thus, the complement of the icand results in signals being applied to one input of the half-adders 127, 137, 147, 157, and 161. As mentioned above, the decoding of two multiplier digits (11) by the decoder 101 results in the generation of a carry applied to the decoder 102. Assuming that $ier_3$ is 1 and $ier_2$ is 0, then the decoder 102 contains 10 plus the 1 carry from the decoder 101 to give a total amount of 11. This means that the bottom line of the decoder 102 is energized and the same type of operation takes place in the second matrix of switching gates as took place in the first matrix of switching gates. The energization of the third output line from the decoder 102 applies one input signal to each of the gates 105, 126, 136, 146, and 156. The other inputs to these gates are connected to the respective input terminals 112, 114, 116, 118, and 119 to which are applied the complement of the multiplicand. As mentioned above, if the multiplicand is 0001, its complement is 11111. Thus, each of the gates 105, 126, 136, 146, and 156 is opened to apply output signals to its output. The output of gate 156 is applied as a second input to the half-adder 161. The gate 146 applies its output as a second input to the half-adder 157, the gate 136 applies its output as the second input to the half-adder 147, the gate 126 applies it output as the second input to the half-adder 137, and the gate 105 applies its output as a second input to the half-adder 127. Thus, half-adders 127, 137, 147, 157, and 161 have two inputs applied to each of them, one from the first matrix of gates and one from the second matrix of gates. Output terminals 171 and 172 each has an input applied to it from the gates 153 and 156. The sum output of the half-adder 161 is 0 which is applied to the output 173 representing the third digit of the product. The carry output from half-adder 161 is applied to one input of half-adder 162. Each of the half-adders in that row of half-adders has a 1 applied to each of its inputs, and, therefore, each of the half-adders 127, 137, 147, and 157 generates a carry output of 1 and a sum output of 0. The sum output of the half-adder 157 is applied to one input of a half-adder 162, and the other input to the half-adder 162 is a 1 from the carry output of the half-adder 161. The sum output of which is applied to terminal 174 is a fourth product digit, and its carry output is 0 which is applied to an input of half-adder 166. The carry output of half-adder 157 is a 1 which is applied as one input to the adder 159, and a second input to the adder 159 is the sum output of the half-adder 147 which is 0. When the bottom line of the decoder 102 was energized, that decoder generated a carry which was transmitted to the device 103 and energized the output of that device. This applied one input to each of gates 128, 138, 148, and 158. The other input to gate 158 is connected to the input terminal 111 which is the multiplicand digit 1. Thus, gate 158 supplies a 1 as a third input signal to the adder 159. Adder 159 has two 1's and a 0 applied to its inputs, and it generates a 0 on its sum output which is applied to another input of half-adder 166 and a 1 on its carry output which is applied to one input of adder 164. The adder 149 receives the sum output of the half-adder 137 which is 0 and the carry output of the half-adder 147 which is 1. Since the second input to gate 148 is connected to the terminal 113 to which a 0 is applied, the gate 148 has a 0 on its output, and this is applied to adder 149 as the third input. The sum output of the adder 149 is 1 and is applied as one input to the adder 165, but the carry output of the adder 149 is 0 which is applied as one input to the adder 164. The adder 139 receives the sum output of the half-adder 127 which is 0 and the carry output of the half-adder 137 which is 1. Again the output from gate 138 is 0 since its input from terminal 115 is 0. Therefore, the sum output of the adder 139 is 1 and is applied as an input to adder 164, and the carry output is 0 and is applied as an input to the adder 163. The half-adder 129 receives a 1 output from the half-adder 127 through the OR gate 106, and a 0 from the gate 128, since one input to the gates 128 is the 0 which is applied to the input terminal 118. The sum output of the half-adder 129 is a 1 and is applied as another input to the adder 163. Considering now the final outputs from the system, the product digits which appear on the output terminals 171–178; the output terminal 171 has a 0 applied to it from the gate 153, the output terminal 172 has a 1 applied to it from the gate 143, and the output terminal 173 has a 0 applied to it as the sum output of the half-adder 161. The half-adder 162 has a 1 applied to it on its input from the carry output of the half-adder 157. Therefore, the sum output from the half-adder 162 is a 1 which is applied to the output terminal 174. The carry output from the half-adder 162 is a 0 and serves as one input to the half-adder 166. The sum output from the adder 159 is 0 so that both inputs to the half-adder 166 are 0's. The sum output from the half-adder 166 is a 0 and is applied to the terminal 175, and the carry output of the half-adder 166 is also a 0 and is applied as one input to the adder 165. The carry output from the adder 159 is a 1 and is applied as another input to the adder 165. The sum output from the adder 149 is a 1 and this is applied as the third input to the adder 165 resulting in a sum output from the adder 165 which is a 0 and which is applied to the output terminal 176, and a carry output which is a 1 and which is applied as an input to the adder 164. The carry output from the adder 149 is a 0 and serves as a second input to the adder 164, and the sum output of the adder 139 is a 1 which provides the third input to the adder 164. Thus, the adder 164 has a sum output which is 0 and which is applied to the output terminal 177 and carry output which is 1 and which is applied to one input to the adder 163. The carry output from the adder 139 is 0 and is second input to the adder 163, and the third input to the adder 163 produces a sum output from the adder 163 which is 0 and which is applied to the output terminal 178. The carry output from the half-adder 129 and the carry output from the adder 163 are not used. From the above, it can be seen that the product as it appears on the output terminals 171–178 is 00001011. This is the product of a multiplicand which is 0001 and is multiplied by a multiplier which is 1011.

The apparatus shown in FIG. 5 comprises two sets of switching matrices and two rows of adders by which the two separate partial product generating steps are accomplished. A third group of gates and a third row of adders provides means for adding a carry from the second step. In the apparatus of FIG. 5 the multiplier digits are considered two at a time, and each pair of multiplier digits is analyzed or decoded to determine what multiple of the multiplicand will be added at that step to produce the product. Each of the two matrices comprises three sets of gates, and the multiplicand is applied to these sets of gates to produce the three values called for by the method of FIG. 4. To one set of gates the multiplicand itself is applied; to a second set of gates two times the multiplicand is applied; and to the third set of gates the complement of the multiplicand is applied. One of these three values of the multiplicand is used in that step, and which one is determined by the value of the two multiplier digits being considered at that step. Thus, the pair of multiplier digits at each step is decoded, and the result of the decoding selects which set of gates will switch in the desired value of the multiplicand. The first row of adders accepts information corresponding to the first step of the operation of FIG. 4. The second row of adders adds in the information from the second step of FIG. 4. The final result is a product which is produced rapidly and accurately. In the apparatus of FIG. 5 the generation of a product requires one gate time plus three adder times plus n carry times. For this reason the apparatus of FIG. 5 is rapid in its operation.

The above specification has described a new and improved product generator using flow-through techniques for multiplying two digitally represented quantities together. The apparatus disclosed in the two embodiments in FIG. 3 and FIG. 5 are rapid and accurate in their operation. The apparatus in FIG. 5 is relatively simple. In both cases a multiplier and a multiplicand having only four digits each has been used to illustrate the system. However, it is contemplated that any number of digits may exist in both the multiplier and the multiplicand used in the apparatus of this invention without departing from the principles illustrated herein. It is realized that others skilled in the art may have additional ways suggested to them by this specification for utilizing the principles of this invention without departing from its spirit. It is, therefore, intended that this invention be limited only by the scope of the amended claims.

What is claimed is:

1. An asynchronous digital product generator for producing the product of a multiplicand having M digits and a multiplier having N digits; said product generator comprising a plurality of groups of switching means; each of said groups having sets of switching means; means for connecting together the outputs of all of the switching means in each set; means for applying to said individual sets of switching means a multiplicand digit, a digit of the complement of said multiplicand, and a digit of a multiple of said multiplicand; a plurality of multiplier decoder means; means for applying to each of said decoder means A multiplier digits to be decoded thereby, where A is any integer between 1 and N; means for connecting the decoded outputs from said individual decoder means to said sets in individual groups of said switching means to select which of said multiplicand digit, multiplicand digit complement or multiplicand digit multiple passes through each of said switching means sets; and means connected to the outputs of said sets of switching means for adding together the outputs from the plurality of groups of switching means, said adding means including a first plurality of adders, each of which adders of said first plurality has at least two inputs and two outputs, means for applying outputs from two of said sets having the same numerical order to inputs of the same adder when the appropriate decoder selects the multiplicand and multiplicand complement digit, and means for applying to the two inputs of each adder associated with any group outputs from sets having different numerical order significance when the appropriate decoder selects said multiplicand multiple digit.

2. The product generator defined in claim 1 wherein the number of groups of switching means is N/A, and wherein each set of switching means comprises one switching means for each combination of said A multiplier digits for which an output is produced by said decoders.

3. The product generator defined in claim 2 wherein the number of multiplier decoders is N/A, each of said decoders comprising a plurality of selection output lines and a carry line, each of said decoders energizing a single selection output line for each multiplier combination which selects the multiplicand or multiplicand multiple digits and energizing a single output line and said carry line for each multiplier combination which selects said multiplicand complement digits.

4. The product generator defined in claim 3 wherein each group of switching means is controlled by one of said multiplier decoders and wherein each set of switching means within a group has applied to it multiplicand information of a single multiplicand digit.

5. The product generator defined in claim 4 further including a carry selection means, means for applying to the input of said carry selection means the carry output from the multiplier decoder having the highest numerical significance, a plurality of gating means, means for applying to individual ones of said gating means individual multiplicand digits, means for applying to all of said gating means the output from said carry selection means, said adding means further including a second plurality of adders which have at least two inputs and two outputs, means for applying to at least one input of individual adder means of said second plurality individual outputs from said individual gating means, and means for applying to other inputs of said individual adders of said second plurality the individual outputs from said first plurality.

6. The product generator defined in claim 5 in which said adding means further includes a third plurality of adders, each of the adders of said third plurality having at least two inputs and two outputs, and means for applying to the individual inputs of said third plurality the individual outputs of said second plurality to accumulate all digits of common significance, the outputs from said third plurality comprising the product generated by said generator.

7. An asynchronous binary product generator for multiplying a multiplicand comprising M digits by a multiplier comprising N digits; said generator comprising N/A multiplier decoders where A is any integer between 1 and N; means for applying A multiplier digits to each of said decoders; each of said decoders having a selection output line for each combination of said A multiplier digits except all zeros and a carry output line; a group of gating means for each of said decoders; each group of gating means comprising sets of gates; means for connecting together all of the outputs of the gating means in each set; means for connecting to each set of gates at least a multiplicand digit, a digit of the complement of said multiplicand and a multiplicand digit of the next higher numerical order; means for connecting all of the output lines from each decoder to its group of gating means so that each combination of A multiplier digits causes said multiplicand digit or the digit of the complement of said multiplicand or said higher order multiplicand digit to be passed through each of the sets of gates in the group; said decoders also energizing the carry output line whenever the output lines which select the digit of the complement of said multiplicand to be selected are energized; means for connecting the carry output line from one decoder to an input of the next higher order decoder where it is considered as another digit input; and first means for adding together the output from said groups of gating means to produce a product.

8. The product generator defined in claim 7 wherein said first adding means includes a plurality of individual adders each comprising at least two inputs and two outputs, means for connecting the outputs from individual sets of gating means having the same numerical order significance to the two inputs of individual adders, and means for accumulating from the individual adders those outputs having the same numerical order significance.

9. The product generator defined in claim 8 further including an additional group of gating means, means for applying said multiplicand digits to said additional group of gating means, means for opening said additional groups of gating means when the carry output line from the highest order decoder is energized, and additional adding means for adding the outputs from said additional group of adding means and the outputs from said first adding means.

* * * * *